US006265864B1

United States Patent
De Winter et al.

(10) Patent No.: US 6,265,864 B1
(45) Date of Patent: Jul. 24, 2001

(54) HIGH SPEED DENSOR CIRCUIT FOR STABILIZED HALL EFFECT SENSOR

(75) Inventors: Rudi De Winter, Heusden-Zolder; Marc Biron, Liege; Vincent Hiligsmann, Chenee, all of (BE)

(73) Assignee: Melexis, N.V., Concorde, NH (US)

( * ) Notice: Subject to any disclaimer, the term of this patent is extended or adjusted under 35 U.S.C. 154(b) by 0 days.

(21) Appl. No.: 09/256,934

(22) Filed: Feb. 24, 1999

(51) Int. Cl.$^7$ .................................................. G01B 7/14
(52) U.S. Cl. ................... 324/207.2; 324/207.25; 324/225
(58) Field of Search ........................... 324/207.2, 207.12, 324/285, 251, 225; 257/421; 327/510, 511; 338/32 M

(56) References Cited

U.S. PATENT DOCUMENTS 5,844,411 * 12/1998 Vogt ...................................... 324/537
5,880,586 * 3/1999 Dukart et al. ...................... 324/207.2

* cited by examiner

*Primary Examiner*—Christine Oda
*Assistant Examiner*—Subhash Zaveri
(74) *Attorney, Agent, or Firm*—Jones, Day, Reavis & Pogue; Blaney Harper

(57) ABSTRACT

An improved Hall effect sensor includes a four-terminal Hall plate with orthogonally paired terminals that produce voltage signals in response to changes in an ambient magnetic field created by the proximity of a ferrous gear tooth to the sensor. Voltage signals from orthogonally paired terminals of the Hall plate are controlled by switches that are coupled to a clock signal generator. In response to the clock signal, the switches allow current to flow in a first direction corresponding to a first phase of the clock and to flow in a second direction corresponding to a second phase of the clock. A plurality of pass gate transistors in the sensor circuitry are connected to a timing generator synchronized with the clock signal generator. The timing generator outputs are received by the gate transistors and the gate transistors control the sequence in which a plurality of capacitors are charged. This plurality of capacitors store the voltage output from the Hall plate. The capacitors are charged in pairs so that one capacitor of the pair receives a voltage signal from a first terminal pair while the other receives a voltage signal from an orthogonal terminal pair as determined by the gate transistors. There are multiple capacitors corresponding to each terminal pair on the Hall plate. Once a capacitor pair is charged, both capacitors in the pair are discharged in response to another signal from the timing generator. Furthermore, they are discharged so that only correctly paired capacitors are discharged simultaneously. Because there are multiple capacitors corresponding to each terminal pair, each of the capacitors is relatively smaller and has a faster response time. Thus, the time delay in responding to the input signal is minimized.

8 Claims, 4 Drawing Sheets

HIGH SPEED DENSOR CIRCUIT FOR STABILIZED HALL EFFECT SENSOR

FIELD OF THE INVENTION

The present invention relates to a Hall effect sensor. More particularly, the present invention relates to a Hall effect sensor for use in detecting rotational movement. Specifically, the present invention relates to a stabilized Hall effect sensor that efficiently detects the movement of gear teeth mounted on a rotating shaft in an engine or other similar apparatus.

BACKGROUND OF THE INVENTION

Modern machinery often uses sensors to measure the movement of various parts in the machinery. These measurements are used to, inter alia, make adjustments in how various parts of the machinery operate, and hence, improve the performance of the machinery. For example, the precise speed with which a shaft having gear teeth thereon rotates may be critical to the operation of an internal combustion engine. In such a case, sensors that are able to precisely measure the speed at which the shaft rotates can be used to provide information to other parts of the engine. Such information can be used, for example, by the part of the engine which controls the timing for the fuel and the spark to improve the performance of the engine.

Hall effect sensors are a class of sensors that are used to, inter alia, detect the movement of ferrous items. As such, they are well suited to uses such as detecting the rotational movement of a shaft in an engine. Specifically, a Hall sensor incorporates a Hall plate that senses the movement of a ferrous item as it passes by the Hall plate. The Hall plate produces a voltage output between two terminals. This voltage output changes as the ferrous item first approaches and then moves away from the Hall plate. When such a Hall plate is mounted adjacent gear teeth on a rotating shaft, the frequency with which the voltage output from the Hall plate increases and decreases is a precise measurement of the rotational speed of the shaft. This voltage output can then be transformed into a different type of electrical signals which may be used by a microprocessor or other circuitry to control various other parts of the engine, for example, the timing of the fuel or spark.

The ability of the Hall sensor to accurately measure movement may significantly affect the performance of machinery such as an engine. Ideally, the output signal of the Hall sensor should immediately begin to increase when a rising edge of a gear tooth approaches the Hall plate and should immediately decline as the gear tooth recedes from the sensor. Additionally, neither manufacturing tolerances nor physical stress on the sensor should affect its operation. In practice, however, timing delay from the Hall sensor circuitry, manufacturing tolerances, physical stress and other factors degrade the performance of the Hall sensor. As the performance of the Hall sensor is degraded, the performance of the machine in which it operates may also be degraded.

In order to avoid some of the practical problems associated with Hall sensors, the prior art has disclosed using a four terminal Hall device such as that shown in FIG. 1. In FIG. 1, the Hall plate 11 incorporates four terminals (2, 4, 6 and 8) connected to two switch pairs 12 and 14 that alternately connect the Hall plate to a voltage source 13 ground 10 or output lines 15, 15'. The switch pairs operate in conjunction with each other so that, for example, when terminal 2 is connected to voltage source 13, terminal 6 is connected to ground 10 terminal 8 is connected to output line 15 and terminal 4 is connected to output line 15'. As a result, a voltage output is developed on output lines 15, 15'. Alternatively, when terminal 4 is connected to ground 10, terminal 8 is connected to voltage source 13 then the voltage output lines are connected to terminals 2 and 6.

The switch pairs 12 and 14 continually switch back and forth in response to a clock signal (not shown). In this way, the source of the output voltage continually switches from terminal pair 4 and 8 to terminal pair 2 and 6. By switching the output voltages between the two terminal pairs, the effects of practical problems such as manufacturing tolerances and physical stress are minimized. This is because the measured output voltage signal ($V_{out}$) is composed of two parts—$V_{(sig)}$ and $V_{(os)}$. $V_{(sig)}$ is a function of the proximity of the gear tooth to the Hall plate and $V_{(os)}$ is an error component that is a function of various physical factors. When the measured output voltage signal from the two terminal pairs are combined, the error components largely cancel out. As a result, the effects from the practical problems of using Hall effect sensors are minimized.

The circuitry that processes the output voltage from the four terminal Hall device is shown in FIG. 2. This circuitry in combination with the Hall device of FIG. 1 creates a Hall sensor. In the circuitry of FIG. 2, the output terminals 15, 15' from the Hall device are connected to operational amplifier ("op amp") 40. The output of op amp 40 is stored in capacitor 48 when a clock signal from the clock 42 has a high logic state. The output from Op Amp 40 is stored in capacitor 46 when clock 42 has a low logic state. The switch pairs 12 and 14 also operate in conjunction with the clock 42. As a result, the output voltage measured between the terminal pair 4 and 8 is stored in capacitor 48 and the voltage measured at terminal pair 2 and 6 is stored in capacitor 46. Both capacitors 48 and 46 have a common connection which, in effect, combines the two output voltage signals. Finally, op amp 47 then creates the final Hall sensor output signal.

While the Hall sensor shown in FIGS. 1 and 2 does minimize some problems associated with general Hall sensors, it also creates problems of its own. In particular, the introduction of capacitors 46 and 48 to store the output voltage signal inherently introduces a timing delay in the system. That is, because of at least the capacitors 46 and 48, the time at which the output signal from amplifier 47 changes in response to the passing of a gear tooth may be significantly delayed from the actual time the gear tooth passed the Hall plate. This delay in the system impairs the performance of the Hall sensor in various applications.

OBJECTS OF THE INVENTION

It is an object of the present invention to improve the performance of a Hall effect sensor.

It is another object of the present invention to improve the performance of a Hall effect sensor by improving the sensor's ability to compensate for thermal errors introduced into the sensor output voltage signal.

It is a further object of the present invention to improve the performance of a Hall effect sensor by improving the sensor's ability to compensate for physical stress related errors in the sensor output voltage signal.

It is still another object of the present invention to improve the performance of a Hall effect sensor by reducing the delay time in the sensor output voltage signal.

SUMMARY OF THE INVENTION

An improved Hall effect sensor includes a four-terminal Hall plate with orthogonally paired terminals that produce voltage signals in response to changes in an ambient magnetic field created by the proximity of a ferrous gear tooth to the sensor. Voltage signals from orthogonally paired terminals of the Hall plate are controlled by switches that are coupled to a clock signal generator. In response to the clock signal, the switches allow current to flow in a first direction corresponding to a first phase of the clock and to flow in a second direction corresponding to a second phase of the clock. A plurality of pass gate transistors in the sensor circuitry are connected to a timing generator synchronized with the clock signal generator. The timing generator outputs are received by the gate transistors and the gate transistors control the sequence in which a plurality of capacitors are charged. This plurality of capacitors store the voltage output from the Hall plate. The capacitors are charged in pairs so that one capacitor of the pair receives a voltage signal from a first terminal pair while the other receives a voltage signal from an orthogonal terminal pair as determined by the gate transistors. There are multiple capacitors corresponding to each terminal pair on the Hall plate. Once a capacitor pair is charged, both capacitors in the pair are discharged in response to another signal from the timing generator. Furthermore, they are discharged so that only correctly paired capacitors are discharged simultaneously. Because there are multiple capacitors corresponding to each terminal pair, each of the capacitors is relatively smaller and has a faster response time. Thus, the time delay in responding to the input signal is minimized.

DESCRIPTION OF THE PREFERRED EMBODIMENTS

Figure 1:
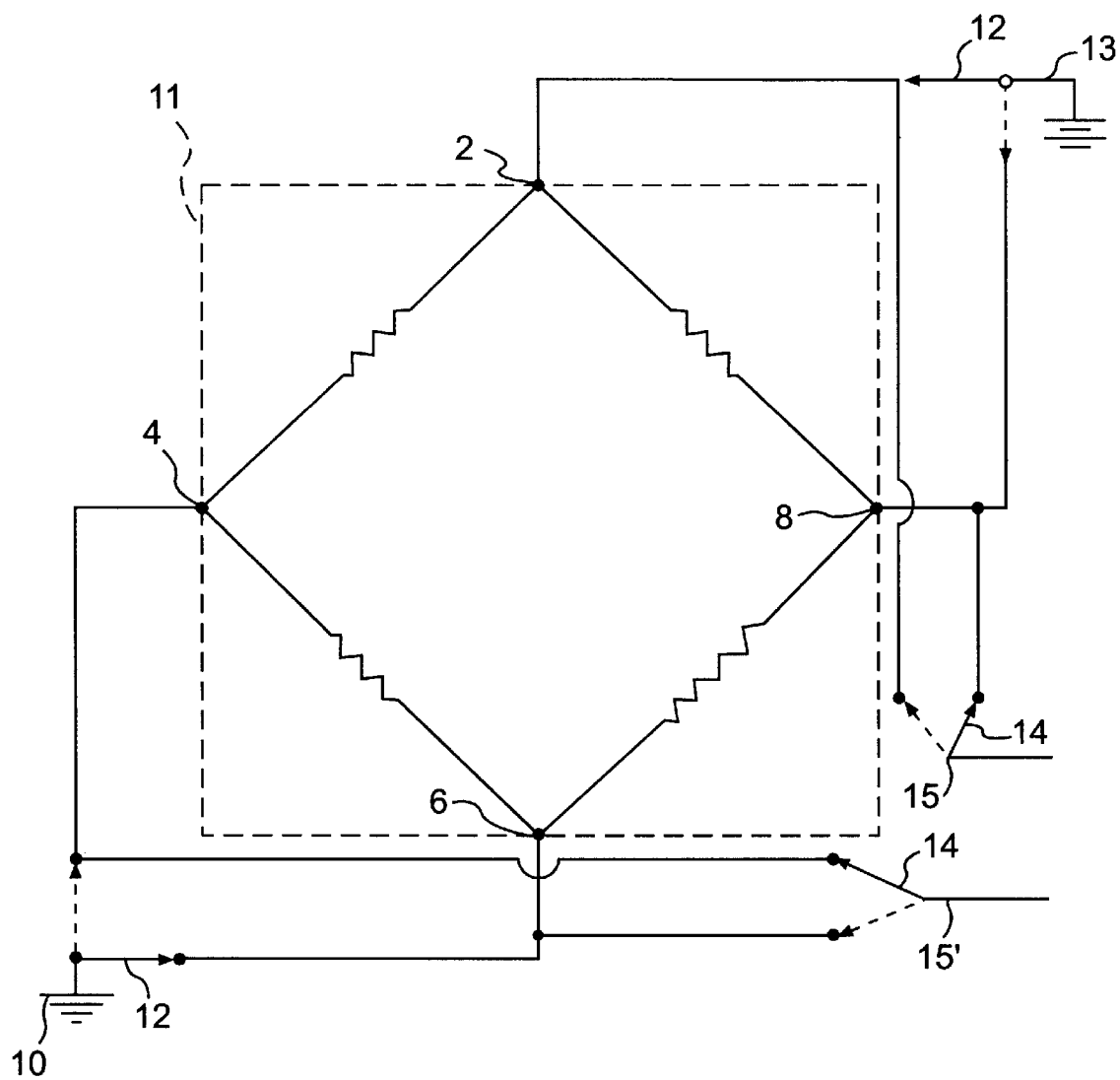
FIG. 1 is a schematic drawing of a prior art four-terminal Hall element with switches for alternately switching the Hall current direction between orthogonally oriented terminal pairs.
Figure 2:
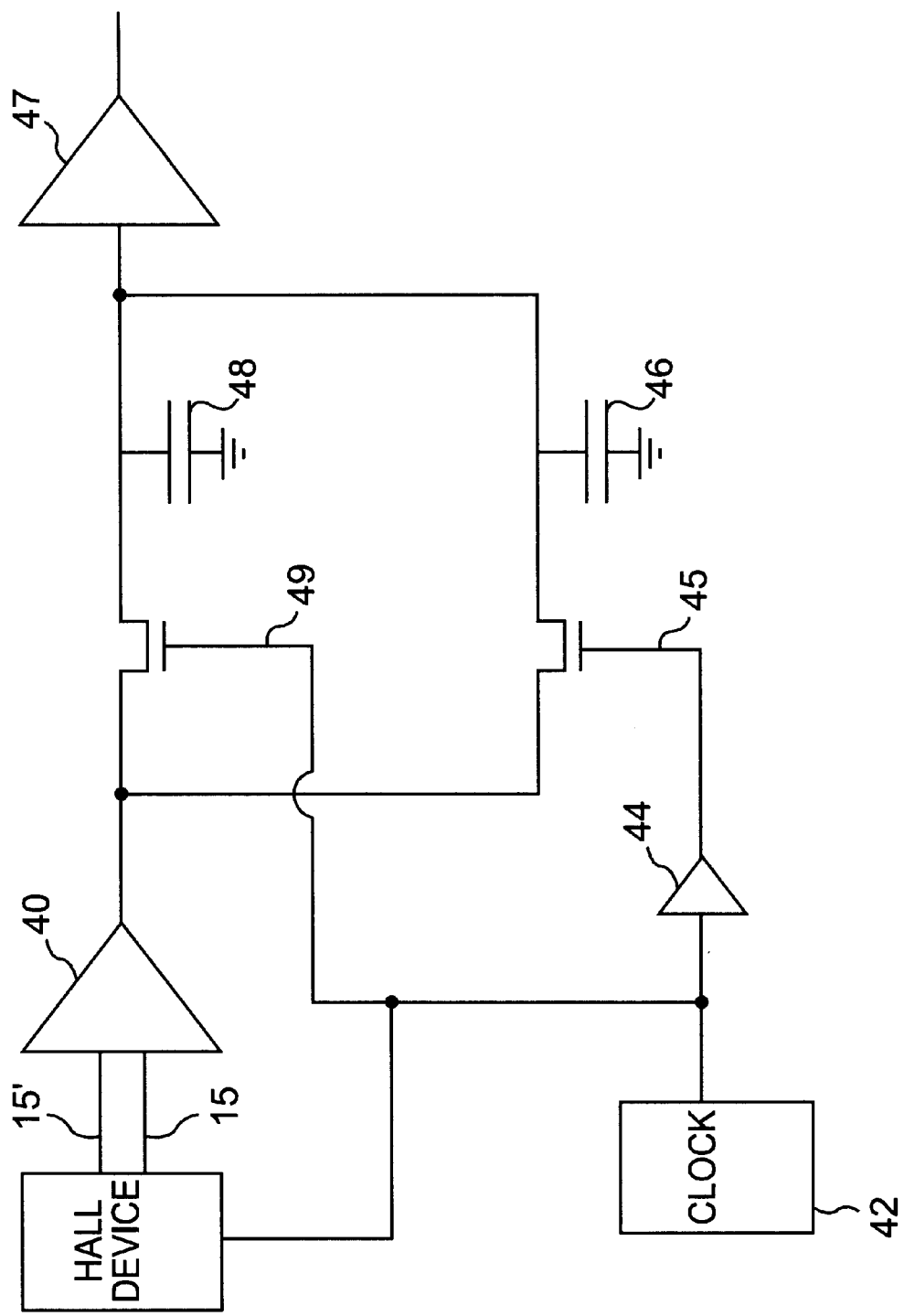
FIG. 2 is a schematic drawing of a prior art signal processing circuitry for a Hall effect sensor making use of a four-terminal Hall element.

The preferred embodiment of the present invention incorporates a four terminal Hall element connected to sensor circuitry. The Hall element includes a Hall plate and switching circuits in which current is alternately switched from flow in a first direction to flow in a second direction through the Hall plate. An example of the Hall element including the switching circuitry is shown in FIG. 1, as described above. The output voltage from the terminal pairs 15, 15' is composed of $V_{os}$, an error term incorporating the effects of thermal and physical stresses on the Hall-plate, and the wanted Hall voltage $V_{sig}$. The output voltage from the Hall-element is processed in a circuit substantially as shown by the elements included in FIG. 3.

The voltage signal from the Hall element 30 is amplified at the op amp 40. The voltage output from the amplifier is then driven through pass gates 81 and 82 on to three pairs of capacitors (although more than three sets of capacitor pairs also could be used) 61–71, 62–72 and 63–73. The sequence in which the plurality of capacitors is charged is controlled by a the clock signal generator 50, and a timing generator 52 that is synchronized with the clock signal generator 50. A first set of three capacitors (61–63) are only charged when current is flowing from terminal 2 to terminal 6 in the Hall element of FIG. 1. The second set of three capacitors (71–73) are only charged when current flows from terminal 8 to terminal 4 in the Hall-element 30 as shown in FIG. 1.

Figure 3:
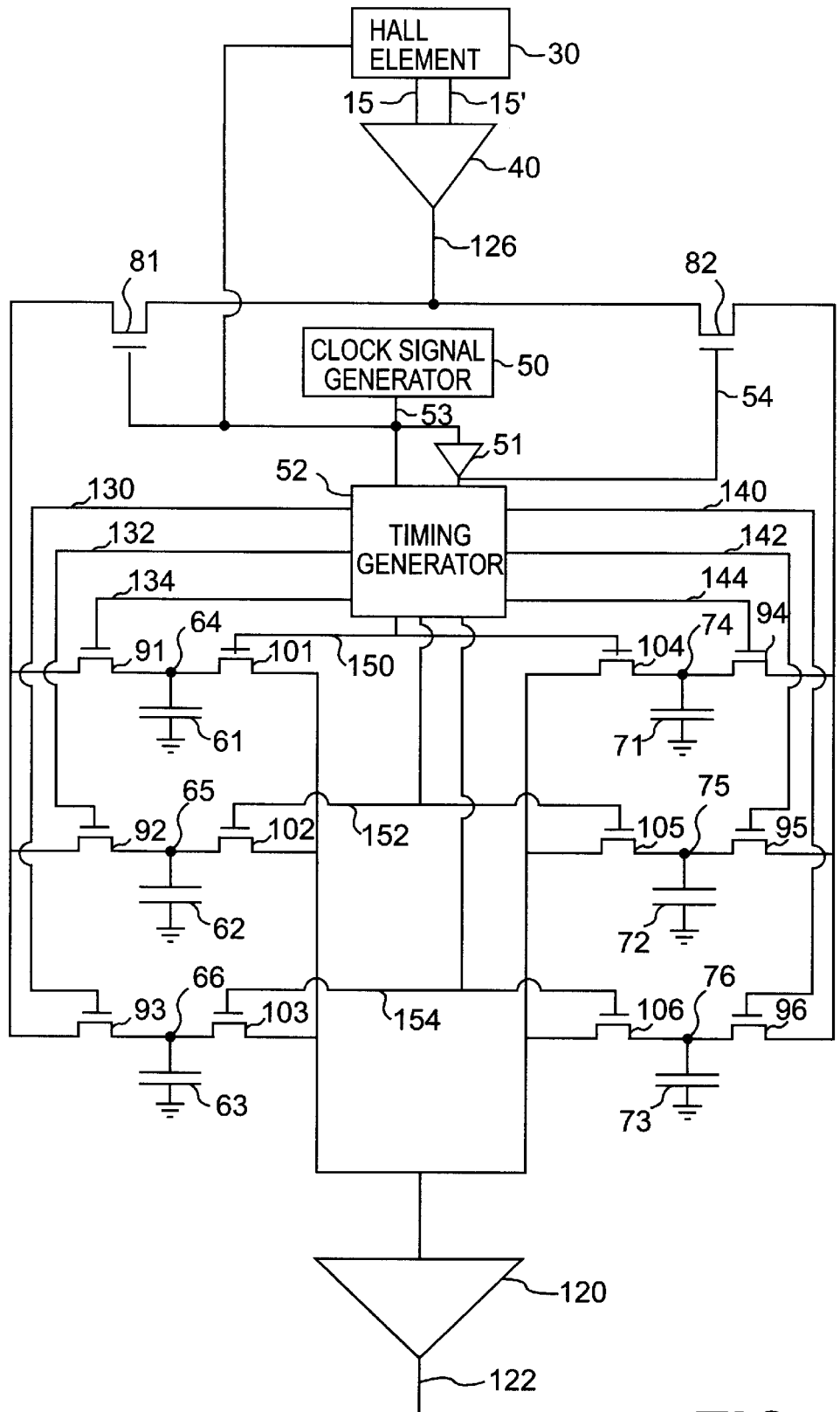
FIG. 3 is a schematic drawing of an embodiment of the present invention in which a four-terminal Hall-element is connected to transistors that control the switching between the primary and orthogonal terminal pairs in the Hall plate, and in which sensor circuitry with pass gate transistors is connected to a timing generator that controls the sequence in which a plurality of capacitors are charged and then discharged to generate an output voltage from the sensor circuit.

Controlling the sequence in which the capacitors are charged is accomplished by connecting the clock signal generator to transistors 81 and 82 in FIG. 3. When current flows from terminal 2 to 6, the clock output signal is in a high binary state as a result, transistor 81 is turned on and allows current to be sent to the inputs of transistors 91, 92 and 93. These transistors are the pass gates to charge capacitors 61–63. Conversely, when current flows from 8 to 4, the clock output signal, which is inverted at 51, sends a high binary output voltage to transistor 82, turning that transistor on while transistor 81 is off, and allowing current to flow to the input of transistors 94, 95 and 96 which are the pass gates to charge capacitors 71–73.

The voltage signal from the Hall element is steered onto each individual capacitor (61, 62, 63, 71, 72 and 73) through the gate transistors 91–93 and 94–96, whose states are controlled by the binary outputs generated by the timing generator 52. The timing generator 52 controls the charging of the capacitors in such a way that the capacitors are charged in pairs, 61–71, 62–72 and 63–73. The timing generator is connected to each pass gate transistor on the circuit. During the time the clock is high, the timing generator 52 first sends a high binary output over conductor 134 to transistor 91 allowing capacitor 61 to charge in response to the output of op amp 40. While the clock signal sends a high binary output to transistor 82, the timing generator turns off transistor 91, and sends a high binary output on conductor 144 to transistor 94, and allows capacitor 71 to charge in response to the output voltage from op amp 40. Subsequently, after capacitors 61 and 71 are charged, a signal 150 from the timing generator turns on transistor 101 and 104 simultaneously. This allows the voltage stored on capacitors 61 and 71 to be discharged to the op amp 120. At the output op amp 120, the voltage components of the output signal corresponding to the error terms substantially cancel each other out because the stored signals are correctly paired. The resulting output voltage signal thus is substantially corrected for $V_{(os)}$ errors by taking advantage of the properties of the four terminal Hall-elements and the resulting output voltage is approximately equivalent to $2V_{(sig0)}$.

Each of the capacitors (62, 63, 72 and 73) are charged in sequence, in pairs, as described above. That is, capacitors 62 and 72 respectively, and capacitors 63 and 73 are charged in response to sequenced timing signals from the timing generator 52 over conductors 132, 142, 130 and 140. Also, the charge on capacitors 62–72 are discharged to op amp 120 when the signal on conductor 142 is high. Finally, the charge on capacitors 63 and 73 are discharged to op amp 120 when the signal on conductor 154 is high. The use of a plurality of three or more capacitors in sequence and controlling the charge reaching each capacitor by employing signals from a timing generator through the use of a plurality of pass gate transistors reduces the size of the capacitors needed to store the voltage from the Hall plate.

Figure 4:
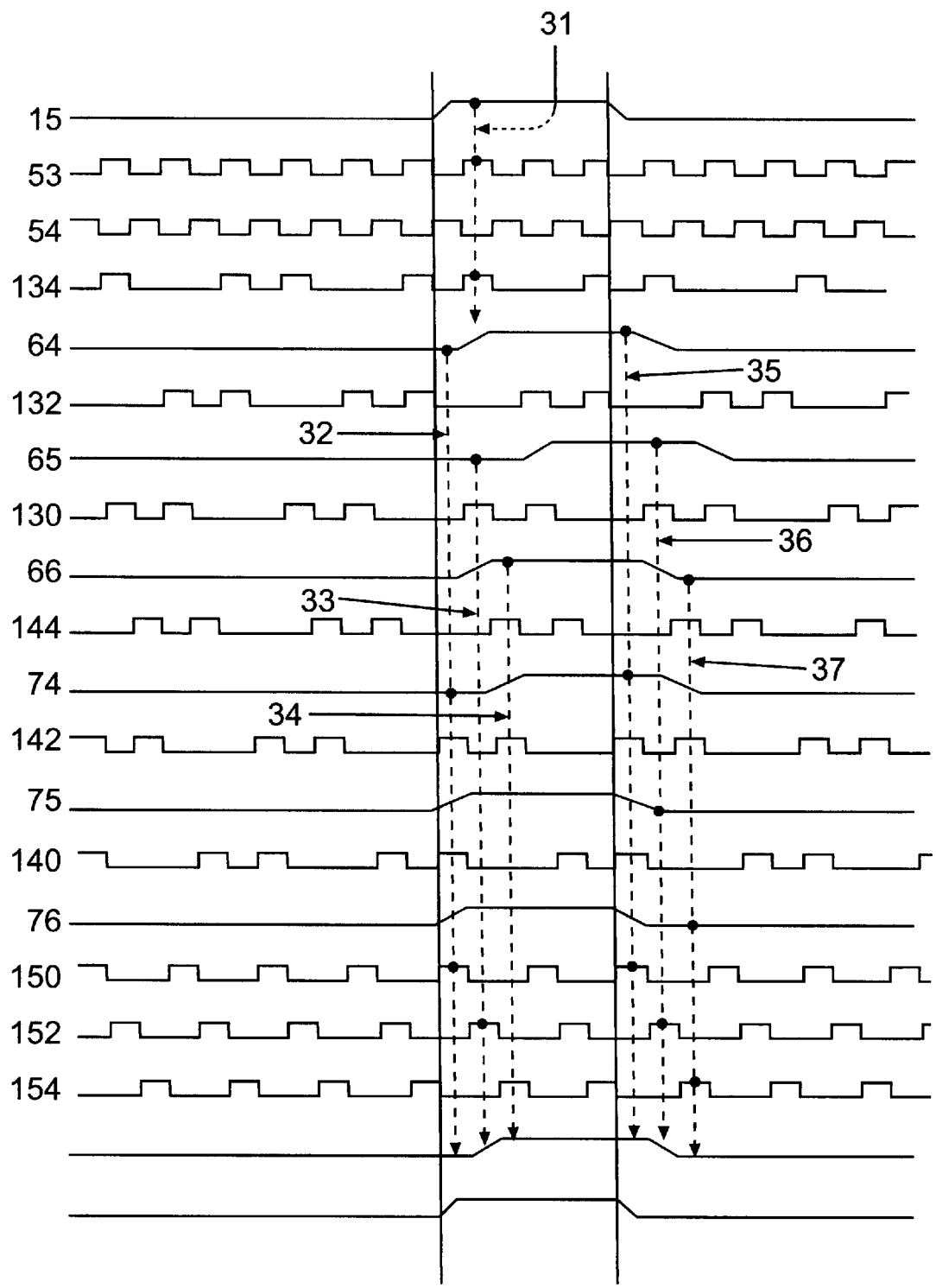
FIG. 4 is a timing diagram for the response of various components of the sensor circuitry illustrated in FIG. 3 to the input voltage signal including the clocked signal, the signal produced by the timing generator synchronized with the clocked signal, the signal reaching the transistors that control the switching between the pairs of terminals associated with the Hall plate, the timing signals received by a plurality of gate transistors that control the timing of voltage signals reaching the capacitors, the timing signal reaching the gate transistors that control the discharge from the plurality of capacitors, and the output voltage signal from the sensor circuitry.

FIG. 4 is a timing chart, illustrating the operation of the present invention by representing the voltages at various points in the circuitry shown in FIG. 3. In particular, as noted at 31 in FIG. 4, when the input on lines 15, 15' to the op amp 40 is high and the clock signal at conductor 53 is high and the timing signal of conductor 134 is high, the voltage at node 64 begins to rise. Similarly, as shown at 34, when the input on conductor 54 is high, and the signal on conductor 144 is high, the voltage on node 74 begins to rise. The capacitor pairs located at nodes 65, 75 and 66, 76 are charged in the same say. Specifically, when the clock is high and the signal on conductor 132 is high, the voltage at node 65 begins to rise and when the clock is low and the signal on conductor 142 is high, the voltage at node 75 begins to rise. Also, as noted at 33, when the clock is high and the signal on conductor 130 is high, the voltage at node 66 begins to rise. And when the clock is low and the signal on conductor 140 is high, the voltage at node 76 begins to rise.

The output signal on conductor 122 begins to rise when the voltage signal on conductor 152 discharges capacitor 72. The output voltage reaches its peak when the voltage signal on conductor 154 is high and discharges capacitors 63 and 73. The signals on conductors 150, 152 and 154 are non overlapping pulses which repetitively scan the storage capacitors to discharge them. In this way, the time 126 between the onset of the input voltage signal at 15, 15' and the start of the output signal 122 is minimized.

The preferred embodiment of the invention uses three capacitor pairs to record the electrical representation of the passage of a single ferrous gear tooth. Each capacitor pair samples only a portion of the time period when a single gear tooth is in close enough proximity to the sensor to induce an electrical current by disturbing the ambient magnetic field. For example, each capacitor pair shown in FIG. 3 samples one third of the time period representing the passage of one gear tooth by the Hall element. Other embodiments of the present invention could use two or more pairs of capacitors. Further, embodiments could also be implemented in sets of three capacitors (rather than pairs) or sets of more than three. Still other embodiments of the invention include all of the elements arranged in substantially the same way as described, except that the pass gates are replaced by circuitry such as multiplexors for coupling the timing signals to the capacitors. In addition, further embodiments of the invention include a Hall plate in which the terminal pairs are oriented at angles that are not orthogonal to each other and there are more than four terminals, i.e., more than two terminal pairs, on the Hall plate.

While this invention has been particularly described and illustrated with reference to particular embodiments thereof, it will be understood by those skilled in the art that changes in the above description or illustrations may be made with respect to form or detail without departing from the spirit or scope of the invention.

We claim:

1. A Hall effect sensor, comprising:
   a Hall plate with a plurality of terminal pairs, with a first terminal pair oriented at an angle to at least one other terminal pair on said Hall plate;
   a Hall-voltage amplifier;
   a clocked signal generator connected to said Hall-voltage amplifier and to said Hall plate;
   a timing generator connected directly to said clocked signal generator;
   a plurality of capacitor sets, each set corresponding to one of said terminal pairs in said plurality of terminal pairs on said Hall plate;
   a plurality of switches that control the flow of voltage to charge said capacitor sets in response to a timing signal from said timing generator, such that one capacitor in said capacitor set corresponding to said first terminal pair in said Hall plate is charged in response to voltage flowing through said first terminal pair, and other capacitors in each capacitor set corresponding to one of said terminal pairs in said plurality of terminal pairs is charged in response to voltage flowing through said corresponding terminal pair in said Hall plate; and
   a voltage output circuit.

2. A ferrous-tooth gear sensor with signal processing circuitry as described in claim 1, further comprising circuitry with a pair of switches connected to said clocked signal generator, where a first switch in said pair of switches is connected to the output from said clocked signal generator and only allows voltage to flow to one capacitor in said plurality of capacitors sets when current flows between said first terminal pair in said Hall plate, and a second switch in said pair of switches connected to a voltage inverter that only allows current to flow to other capacitor sets in said plurality of capacitor sets when current flows between terminals in said plurality of terminal pairs in said Hall plate.

3. A Hall effect sensor as described in claim 1, wherein said plurality of terminal pairs on said Hall plate are oriented orthogonally to each other.

4. A Hall effect sensor, comprising:
   a four-terminal Hall plate with a first terminal pair and a second terminal pair oriented orthogonally to the first terminal pair:
   a Hall-voltage amplifier;
   a clocked signal generator connected to said Hall-voltage amplifier and to said Hall plate;
   a timing generator connected directly to said clocked signal generator;
   a plurality of capacitor pairs, each pair corresponding to one of the terminal pairs on said Hall plate;
   a plurality of switches that control the flow of voltage to charge said capacitor pairs in response to a timing signal from said timing generator, such that one capacitor in each pair is charged in response to voltage flowing through said first terminal pair, and the other capacitor in each pair is charged in response to voltage flowing through said second terminal pair, in said Hall plate; and
   an output circuit.

5. A ferrous-tooth gear sensor with signal processing circuitry as described in claim 1, further comprising circuitry with a pair of switches connected to said clocked signal generator, where a first switch in said pair of switches is connected to the output from said clocked signal generator and only allows voltage to flow to one capacitor in said plurality of capacitors pairs when current flows between said first terminal pair in said Hall device, and a second switch in said pair of switches is connected to said voltage inverter and only allows current to flow to the other capacitor in said plurality of capacitor pairs when current flows between said second terminal pair in said Hall device.

6. A ferrous-tooth gear sensor with signal processing circuitry as described in claim 1, further comprising circuitry with a pair of switches connected to said clocked signal generator, where a first switch in said pair of switches is connected to the output from said clocked signal generator and only allows voltage to flow to one capacitor in said plurality of capacitors pairs when current flows between said first terminal pair in said Hall device, and a second switch in said pair of switches is connected to said voltage inverter and only allows current to flow to the other capacitor in said plurality of capacitor pairs when current flows between said second terminal pair in said Hall device.

7. A method of processing voltage signals from a four-terminal Hall device sensor using clocked signals and timing signals to control the sequence and timing of switching between two terminal pairs in said four-terminal Hall device sensor and to control the sequence in which a plurality of capacitors pairs are charged and discharged to produce a single output voltage.

8. A ferrous-tooth gear sensor with signal processing circuitry, comprising;

a four-terminal Hall device with a first terminal pair, and a second terminal pair oriented orthogonally to the first terminal pair;

means for switching between said first and second terminal pairs in said four-terminal Hall device;

means for amplifying voltage outputs from said four-terminal Hall device;

means for generating clocked signals;

means for inverting clocked signals;

means for generating a timing signal coordinated with said means for generating clocked signals;

a plurality of capacitor pairs;

means for controlling the sequence in which each capacitor in said plurality of capacitor pairs is charged such that one capacitor in each pair of said plurality of capacitor pairs is charged when current is generated at said first terminal pair of said Hall device, and the other capacitor in each pair of said plurality of capacitor pairs is charged when current is generated at said second terminal pair of said Hall device; and means for controlling the discharge of voltage from said capacitor pairs.

* * * * *